(12) United States Patent
Alatorre et al.

(10) Patent No.: US 8,341,312 B2
(45) Date of Patent: Dec. 25, 2012

(54) SYSTEM, METHOD AND PROGRAM PRODUCT TO MANAGE TRANSFER OF DATA TO RESOLVE OVERLOAD OF A STORAGE SYSTEM

(75) Inventors: Gabriel Alatorre, Long Beach, CA (US); Aameek Singh, University Place, WA (US); Laura Richardson, Ridge Manor, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/097,510

(22) Filed: Apr. 29, 2011

(65) Prior Publication Data

US 2012/0278511 A1 Nov. 1, 2012

(51) Int. Cl.
*G06F 17/50* (2006.01)
*G06F 9/45* (2006.01)
*G06F 3/00* (2006.01)
*G06F 13/28* (2006.01)
*G06F 13/00* (2006.01)

(52) U.S. Cl. .................. 710/33; 703/13; 703/22; 710/5; 710/15; 710/29

(58) Field of Classification Search .................... 703/13, 703/19, 20, 21, 22; 710/1, 5, 15, 18, 29, 710/33, 34
See application file for complete search history.

(56) References Cited

U.S. PATENT DOCUMENTS

| | | | |
|---|---|---|---|
| 7,007,048 B1 | 2/2006 | Murray et al. | |
| 7,657,572 B2 | 2/2010 | Raciborski et al. | |
| 7,711,711 B1 | 5/2010 | Linnell et al. | |
| 2003/0198184 A1 | 10/2003 | Huang et al. | |
| 2005/0193070 A1 | 9/2005 | Brown et al. | |
| 2006/0184401 A1 | 8/2006 | DelGaudio et al. | |
| 2007/0208788 A1 | 9/2007 | Chakravarty et al. | |
| 2007/0239747 A1 | 10/2007 | Pepper | |
| 2008/0052331 A1 | 2/2008 | Ogawa et al. | |
| 2009/0022055 A1 | 1/2009 | Tan et al. | |
| 2009/0046775 A1 | 2/2009 | Thiagarajan et al. | |
| 2009/0249222 A1 | 10/2009 | Schmidt et al. | |
| 2010/0082765 A1 | 4/2010 | Murase | |
| 2010/0157834 A1 | 6/2010 | Keromytis et al. | |
| 2011/0320555 A1* | 12/2011 | Qiu et al. ..................... | 709/207 |

OTHER PUBLICATIONS

"Smarter Information Lifecycle Management" IP.COM 207370D dated May 27, 2011.
Mungal, Anthony G.; "Multi-Core Processing and Tiered Storage Model" EMC Corporation, Copyright 2008.
"EMC Solutions for Enterprises EMC Tiered Storage for Oracle ILM Enabled by EMC Symmetrix v-Max" Reference Architecture, EMC Global Solutions, Copyright 2009.

(Continued)

*Primary Examiner* — Chun-Kuan Lee
*Assistant Examiner* — Richard B Franklin
(74) *Attorney, Agent, or Firm* — Arthur J. Samodovitz

(57) ABSTRACT

Managing a data transfer from one or more source storage devices to one or more target storage devices. The data transfer comprises concurrent transfer of a multiplicity of data units pursuant to respective data transfer commands. The concurrent transfer of the multiplicity of data units is currently in-progress. A computer determines a currently-overloaded storage component involved in the data transfer. The computer determines a plurality of the data transfer commands that involve the overloaded storage component. The computer determines an approximately-minimum number of the data transfer commands to cancel to stop overload of the overloaded storage component. In response, the computer cancels the minimum number of the data transfer commands.

20 Claims, 4 Drawing Sheets

OTHER PUBLICATIONS

Sun, Lin-Chung et al.; "Design and Implementation of Information Lifecycle Management System on Hierarchial Storage Management" Abstract only.
Babineau, Brian et al.; "Controlling Storage Costs with Oracle Database 11g", Enterprise Strategy Group, White Paper, Feb. 2008.
"A Blueprint for Tiered Storage", An IT Briefing produced by SearchStorage.com, Apple Computers Inc. Copyright 2004 and TechTarget Design Copyright 2003.
Zhao, Xiaonan et al.; Block-Level Data Migration in Tiered Storage System, Second International Conference on Computer and Network Technology, IEEE, 2010.
Zhang, Gong et al.; Automated Lookahead Data Migration in SSD-Enabled Multi-tiered Storage Systems, IEEE, 2010.
Ju, Jean et al,; "Projection Algorithms for IBM DASD Cache Analysis Tool" 13th International Computer Measurement Group Conference, Orlando, FL, Dec. 7-11, 1987.
"IntelliMagic, Storage Intelligence, IntelliMagic Direction" 2010, http://www.intellimagic.net/intellimagic/products/intellimagic-direction (1 page).
"IntelliMagic, Storage Intelligence, Solutions" 2010, http://www.intellimagic.net/intellimagic/products/intellimagic-direction/solutions (1 page).
IntelliMagic, Storage Intelligence, Sample Results 2010, http://www.intellimagic.net/intellimagic/products/intellimagic-direction/sample-results (4 pages).
"IntelliMagic, Storage Intelligence, Disk Magic for IBM" 2010, http://www.intellimagic.net/intellimagic/products/disk-magic-for-ibm (1 page).
Ruemmler, Chris et al.; "An Introduction to Disk Drive Modeling", Hewlett-Packard Laboratories, IEEE, Mar. 1994.
Lu, Chenyang et al.; "Aqueduct: Online Data Migration with Performance Guarantees", pp. 219-230, Conference on File and Storage Technologies (Fast '02), Jan. 28-30 2002, Monterey, CA.

* cited by examiner

SYSTEM, METHOD AND PROGRAM PRODUCT TO MANAGE TRANSFER OF DATA TO RESOLVE OVERLOAD OF A STORAGE SYSTEM

RELATED APPLICATION

This patent application is related to pending patent application "System, Method and Program Product to Schedule Transfer of Data" filed same day herewith by Gabriel Alatorre, James E. Olson and Aameek Singh, Ser. No. 13/097,555.

FIELD OF THE INVENTION

The present invention relates generally to data transfer between storage devices, and more specifically to managing a data transfer based on availability of resources within storage components involved in the data transfer.

BACKGROUND OF THE INVENTION

Various types of storage devices such as disk storage (with mechanical read/write heads and magnetic storage elements) and semiconductor storage such as flash memory are known today. In general, semiconductor storage devices have fast random read/write access, and disk storage devices have fast sequential read/write access. Moreover, different disk storage devices have different rotational speeds resulting in different access times. For example, a 15,000 RPM disk storage device has faster access than a 10,000 RPM disk storage device. Likewise different types of semiconductor storage devices exhibit different performance. For example, a NAND flash memory device writes faster but reads slower than a NOR flash memory-based device. Generally, the more expensive the storage device the faster it can read/write data and vice versa.

Previously known data life cycle management programs managed and migrated data (in data units/granularities of files, storage extents or storage volumes) to different types of storage devices based on recent frequency of access of the data unit, age of the data unit, and/or changing requirements of the data owner for the data units, etc. Generally, data that is newer is regarded as having higher importance than data which is older because the newer data typically experiences greater frequency of access. Consequently, the newer data is stored in more expensive, high performance storage devices. Conversely, data that is older, typically experiences lower frequency of access so is stored in less expensive, slower access storage devices. In a previously known data life cycle management program, a data owner specified rules that determine when a data unit needs to be moved. For example, there is a rule to move data from expensive flash memory to less expensive disk storage when the data unit's frequency of access drops below a specified threshold. A known performance monitoring system (such as the previously known IBM Tivoli Storage Productivity Center program) tracks frequency of access of a given data unit, and records the frequency of access as "metadata". The IBM Tivoli Storage Productivity Center program records the number of I/O requests a data unit receives at regular time intervals. The IBM Tivoli Storage Productivity Center program also tracks the average data transfer size of each I/O request, whether there was a "cache hit" for the I/O request, whether the requested data for both reads and writes was sequential to a prior or subsequent I/O request, whether the I/O request resulted in an out-paging/de-staging of data into the cache and average cache hold time.

It was previously known to transfer data from a source storage device to another storage device for reasons other than life cycle management. For example, one storage device may be close to capacity, and data needs to be transferred to another storage device with greater available capacity (and the same or different access speed) to accommodate expected growth of the data. As another example, an application which cannot readily access its data in its current storage device needs faster access to the data, so the data is transferred to another storage device (of the same or different access speed) that is readily accessible by the application. It was also known to transfer data from a source storage device to another storage device for load balancing and storage consolidation.

In any of the foregoing scenarios where there is a need to transfer data for any reason, it was known to either execute the transfer immediately or schedule the data transfer to execute during off peak hours when there is more network bandwidth available and when storage components are less utilized. It was previously known to monitor the status and availability of the network bandwidth and resources within the storage components using an existing monitoring program that tracks current and past performance data.

It was also known to adjust the data transfer rate if a bandwidth utilization threshold or response time threshold has been exceeded.

A previously known Disk Magic™ modeling program manufactured by IntelliMagic Inc. estimates the utilizations of individual, respective I/O components involved in a data transfer. The I/O components involved in the data transfer are (a) storage subsystems which provide LUNs to a virtual storage controller program, (b) storage pools which are groups of LUNs, and (c) the virtual storage controller which groups LUNs having similar characteristics into storage pools and virtualizes the storage locations to route I/O requests correctly regardless of where the data physically resides. An "LUN" or logical unit number is a single disk or set of disks viewed as a single storage unit. Components that can be over-utilized, and thereby limit I/O traffic, include the storage device adapters, host adapters and storage subsystem processors. I/O is also limited by the capacity of hard disks to perform read/writes (based on read/write head speed, read/write time, etc.). The previously known Disk Magic modeling program was used primarily in a planning operation for data placement. To use the Disk Magic modeling program, an administrator entered projected (a) number of I/O requests per second, (b) average transfer size per I/O request, (c) total and sequential read/write percentages, (d) average cache-hold time, (e) average read cache-hit percentage, and (f) percentage of de-stage operations for each block of data that was to be placed in the storage system. These factors all affect the utilization of components within the storage system. The previously known Disk Magic modeling program then calculated the projected utilizations of the storage components in various available storage arrangements where the data is stored in different storage pools, and identified the projected utilization for the optimum storage arrangement.

The algorithm used by the Disk Magic modeling program to determine the utilizations of the storage components based on the foregoing factors is proprietary to IntelliMagic Inc. and unknown to the present inventors. However, the following is another algorithm to determine utilizations of storage components based on similar factors:

For an available disk storage system, an administrator obtains the following values from the disk storage system manufacturer:
   Sector size (e.g. 256 bytes)
   Cylinders (e.g. 1500)
   Tracks per cylinder (e.g. 8)
   Sectors per track (e.g. 113)
   Track skew (e.g. 34 sectors)
   Cylinder skew (e.g. 43 sectors)
   Revolution speed (e.g. 7200 RPM)
   Read fence size (e.g. 8 KB)
   Sparing type (e.g. sector or track)
   Cache size (e.g. 32 KB)
These parameters are used when calculating constants used in the equations that follow.
A seek time (needed for calculating the response time of the storage subsystem) is estimated in one of the following ways:
   a. A constant value
   b. Based on a linear function where x is average seek distance in cylinders
   c. Based on a curve (e.g. Lee's seek equation), where minSeek, avgSeek, and maxSeek are estimated as follows:

$$seekTime(x) = \begin{cases} 0 & : \text{if } x = 0 \\ a\sqrt{x-1} + b(x-1) + c & : \text{if } x > 0, \end{cases}$$

where
   x is the seek distance in cylinders,
   a=(−10minSeek+15avgSeek−5maxSeek)/(3$\sqrt{numCyl}$),
   b=(7minSeek−15avgSeek+8maxSeek)/(3numCyl), and
   c=minSeek.
   d. Based on an HPL seek equation, where the values $V_1$-$V_6$ are estimated as follows:

| Seek distance | Seek time |
|---|---|
| 1 cylinder | $V_6$ |
| < $V_1$ cylinders | $V_2 + V_3 * \sqrt{dist}$ |
| >= $V_1$ cylinders | $V_4 + V_5 * dist$ | where list is the seek distance in cylinders.
   If $V_6$=−1, single-cylinder seeks are computed using the second equation. $V_1$ is specified in cylinders, and $V_2$ through $V_6$ are specified in milliseconds.
   $V_1$ must be a non-negative integer. $V_2 \ldots V_5$ must be non-negative floats and $V_6$ must be either a non-negative float or −1.
   An example (HP C2200A disk):

| <616 cylinders | seek time in ms = 3.45 + 0.597$\sqrt{dist}$ |
|---|---|
| ≧616 cylinders | seek time in ms = 10.8 + 0.012 * dist |

The foregoing model to determine utilizations of storage components also considers the characteristics of the cache when calculating the seek time because cache hits eliminate the seek time of an I/O request. The percentage of I/O requests that result in no seek time is reflected by the cache-hit percentage (passed in as input). To calculate the response time of the storage subsystem, the seek time is added to the average disk controller overhead, which is a constant that has been previously calculated (e.g. 1.1 ms per read request, 5.1 ms per write request). The disk controller is responsible for processing I/O requests so the utilization value of a disk controller can be calculated using a linear function, where x is the number of I/O requests received. Similarly, the utilization value of the processor can be calculated using a linear function dependent on the number of I/O requests received because the processor is used by the disk controller when processing I/O requests. The host adapter sends I/O requests and processes responses so the host adapter also can be similarly modeled using a linear function dependent on the number of I/O requests sent. The hard disk drive utilization value can be set to the number of I/O requests. Utilization percentages are then calculated by dividing these estimated utilization values by their respective pre-defined capacities.

An object of the present invention is to manage a data transfer based on availability of resources within storage components involved in the data transfer.

SUMMARY OF THE INVENTION

The present invention resides in a system, method and program product for managing a data transfer from one or more source storage devices to one or more target storage devices. The data transfer comprises concurrent transfer of a multiplicity of data units pursuant to respective data transfer commands. The concurrent transfer of the multiplicity of data units is currently in-progress. A computer determines a currently-overloaded storage component involved in the data transfer. The computer determines a plurality of the data transfer commands that involve the overloaded storage component. The computer determines an approximately-minimum number of the data transfer commands to cancel to stop overload of the overloaded storage component. In response, the computer cancels the minimum number of the data transfer commands.

The overloaded storage component can be a virtual storage controller which maps virtual storage addresses to real storage addresses in the one or more source storage devices or the one or more target storage devices. The overloaded storage component can be a storage subsystem which includes one or more of the source storage devices or one or more of the target storage devices.

According to a feature of the present invention, the present invention determines the approximately-minimum number of the data transfer commands to cancel by hypothetically canceling approximately half of the data transfer commands that involve the overloaded storage component, determining if the overloaded storage component would still be overloaded if the approximately half of the data transfer commands that involve the overloaded storage component were hypothetically canceled, and if not, hypothetically canceling approximately one fourth of the data transfer commands that involve the overloaded storage component instead of hypothetically canceling approximately half of the data transfer commands that involve the overloaded storage component and determining if the overloaded storage component would still be overloaded if the approximately one fourth of the data transfer commands that involve the overloaded storage component were hypothetically canceled.

DETAILED DESCRIPTION OF THE PREFERRED EMBODIMENTS

Figure 1:
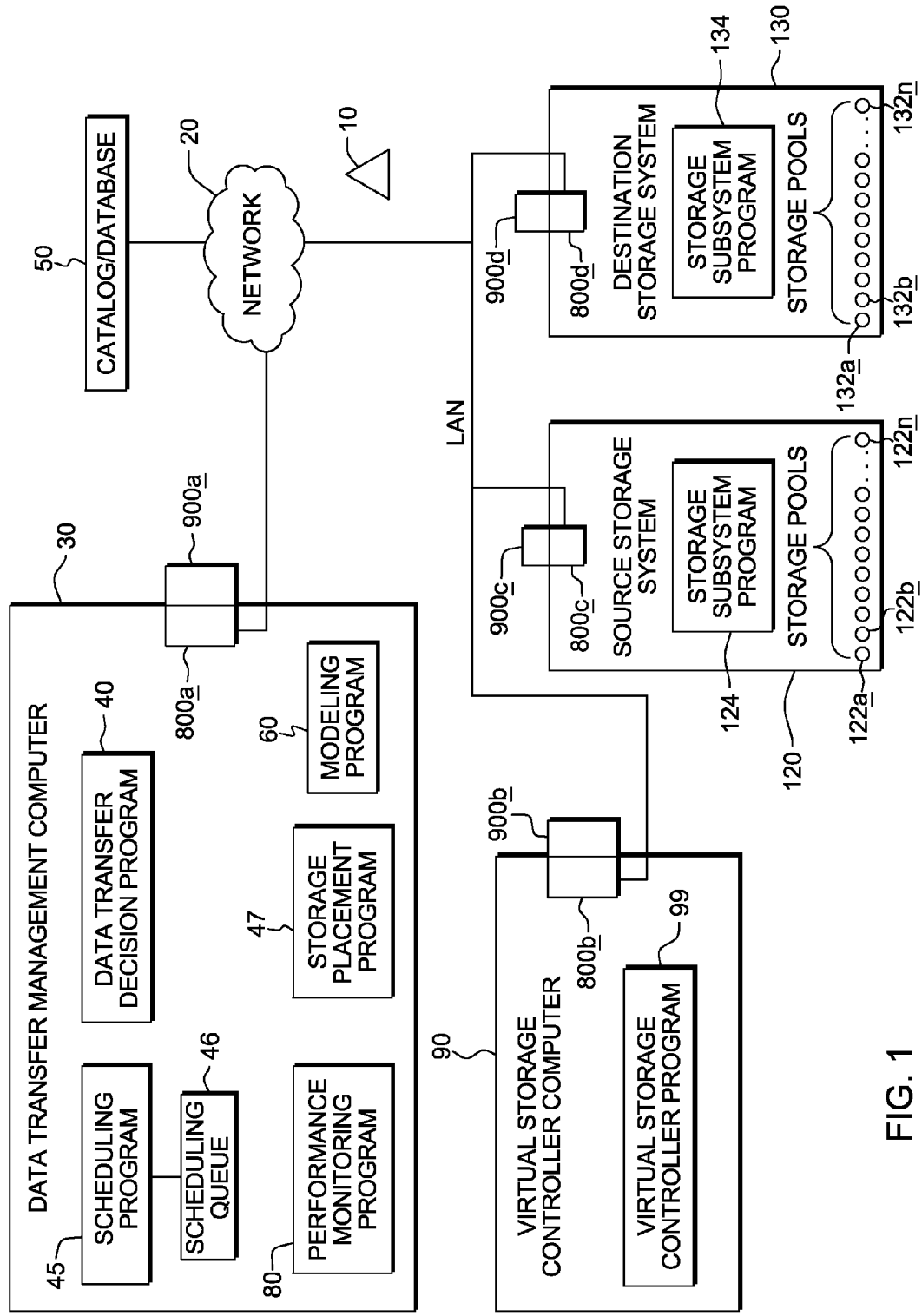
FIG. 1 is a block diagram of a distributed computer system embodying the present invention.

The present invention will now be described in detail with reference to the Figures. FIG. 1 illustrates a distributed computer system, generally designated 10, in accordance with one embodiment of the present invention. System 10 includes a data transfer management computer 30, storage subsystems 120 and 130, a catalog/database 50 of metadata for data units in storage subsystems 120 and 130 and a virtual storage controller computer 90. Storage subsystem 120 includes storage LUNs 122 a-n and associated read/write heads (not shown) in one embodiment, or semiconductor circuitry in another embodiment. Storage subsystem 130 includes storage LUNs 132a-n and associated read/write heads (not shown) in one embodiment, or semiconductor circuitry in another embodiment. A LUN or logical unit number is a single disk or set of disks classified as a single storage unit. The virtualization storage controller computer 90 organizes LUNs from storage subsystems 120 and 130 into storage pools. A single storage pool can comprise LUNs from one of storage subsystems 120 or 130 or from both storage subsystems 120 or 130. In the illustrated example, storage subsystem 120 serves as a source pool or source device and storage subsystem 130 serves as the destination pool or destination device. The storage subsystems 120 and 130 can be local or remote to each other but are connected to the same virtual storage controller computer 90, typically via a local area network ("LAN"). Data transfer management computer 30, virtual storage controller computer 90 and catalog/database 50 are coupled to each other by one or more networks 20 such as local area network(s) or wide area network(s) such as the Internet. Typically, the virtual storage computer 90 is local to the storage devices which it virtualizes, and coupled together via a local area network.

Data transfer management computer 30 also includes a data transfer decision program 40, according to the prior art, which determines that one or more data units should be transferred from a source storage pool to a destination storage pool based on any of a wide range of factors such as data life cycle management, insufficient remaining capacity of the source storage device, or need by a remote application for a copy of the data units local to the remote application. Computer 30 also includes a storage placement program 47, according to the prior art, which determines where to place/store data or copies of the data in storage to optimize load balancing or to consolidate storage. Computer 30 also includes a performance monitoring program 80, according to the prior art, which tracks the number of I/O reads/writes, response times of the storage subsystems, and other performance parameters of the various storage devices including the virtual storage controller 90, storage subsystems 120 and 130, and storage pools. Performance monitoring program 80 also tracks data transfer history such as size, duration and identity of storage devices involved in the transfer. Performance monitoring program 80 also maintains a catalog of the data units which are stored in storage subsystems 120 and 130. Performance monitoring program 80 obtains the identities and locations of these data units in the storage subsystems from agent programs executing in the storage subsystems which obtain the information by querying data unit configuration files in the storage subsystems. Performance monitoring program 80 provides this information to the data transfer decision program 40 and the scheduling program 45 as needed.

Computer 30 also includes a scheduling program 45, according to the present invention, which determines when to transfer the data units, associated with data transfer requests, after the decision is made to transfer the data units. A scheduling queue 46 receives the data transfer requests and contains them until the scheduling program 45 schedules them by sending them to the virtual storage controller for execution. The scheduling program 45 processes Computer 30 also includes a modeling program 60, preferable the previously known Disk Magic modeling program, which determines the utilizations of respective storage components involved in a data transfer. Programs 40, 45, 47, 60 and 80 can be stored and executed in a single computer 30 as shown, or installed and executed in respective different computers (having similar basic hardware and operating system as computer 30) coupled to network 20. As an alternate to the Disk Magic modeling program, the following is another algorithm to determine utilizations of storage components based on similar factors:

For an available disk storage system, an administrator obtains the following values from the disk storage system manufacturer:

Sector size (e.g. 256 bytes)

Cylinders (e.g. 1500)

Tracks per cylinder (e.g. 8)

Sectors per track (e.g. 113)

Track skew (e.g. 34 sectors)

Cylinder skew (e.g. 43 sectors)

Revolution speed (e.g. 7200 RPM)

Read fence size (e.g. 8 KB)

Sparing type (e.g. sector or track)

Cache size (e.g. 32 KB)

These parameters are used when calculating constants used in the equations that follow.

A seek time (used for calculating the response time of the storage subsystem) is estimated in one of the following ways:

a. A constant value b. Based on a linear function where x is average seek distance in cylinders c. Based on a curve (e.g. Lee's seek equation), where minSeek, avgSeek, and maxSeek are estimated as follows:

$$seekTime(x) = \begin{cases} 0 & : \text{if } x = 0 \\ a\sqrt{x-1} + b(x-1) + c & : \text{if } x > 0, \end{cases}$$

where x is the seek distance in cylinders, $a = (-10\text{minSeek} + 15\text{avgSeek} - 5\text{maxSeek})/(3\sqrt{\text{numCyl}})$.

$b = (7\text{minSeek} - 15\text{avgSeek} + 8\text{maxSeek})/(3\text{numCyl})$, and $c = \text{minSeek}$.

d. Based on an HPL seek equation, where the values $V_1$-$V_6$ are estimated as follows:

| Seek distance | Seek time |
|---|---|
| 1 cylinder | $V_6$ |
| $< V_1$ cylinders | $V_2 + V_3 * \sqrt{dist}$ |
| $>= V_1$ cylinders | $V_4 + V_5 * dist$ | where dist is the seek distance in cylinders.

If $V_6 = -1$, single-cylinder seeks are computed using the second equation. $V_1$ is specified in cylinders, and $V_2$ through $V_6$ are specified in milliseconds.

$V_1$ must be a non-negative integer, $V_2 \ldots V_5$ must be non-negative floats and $V_6$ must be either a non-negative float or $-1$.

An example (HP C2200A disk):

| | |
|---|---|
| <616 cylinders | seek time in ms = 3.45 + 0.597√dist |
| ≧616 cylinders | seek time in ms = 10.8 + 0.012 * dist |

The foregoing model to determine utilizations of storage components also considers the characteristics of the cache when calculating the seek time because cache hits eliminate the seek time of an I/O request. The percentage of I/O requests that result in no seek time is reflected by the cache-hit percentage (passed in as input). To calculate the response time of the storage subsystem, the seek time is added to the average disk controller overhead, which is a constant that has been previously calculated (e.g. 1.1 ms per read request, 5.1 ms per write request). The disk controller is responsible for processing I/O requests so the utilization value of a disk controller can be calculated using a linear function, where x is the number of I/O requests received. Similarly, the utilization value of the processor can be calculated using a linear function dependent on the number of I/O requests received because the processor is used by the disk controller when processing I/O requests. The host adapter sends I/O requests and processes responses so the host adapter also can be similarly modeled using a linear function dependent on the number of I/O requests sent. The hard disk drive utilization value can be set to the number of I/O requests. Utilization percentages are then calculated by dividing these estimated utilization values by their respective pre-defined capacities.

The following documents describe other known performance modeling algorithms, which documents are hereby incorporated by reference as part of the present disclosure: "An Introduction to Disk Drive Modeling" by Chris Ruemmler and John Wilkes of Hewlett-Packard Laboratories, Published by IEEE 19940018-9162, March 1994, and "Projection Algorithms For IBM DASD Cache Analysis Tool" by Jean Ju and Stan Caldwell of International Business Machines Corporations, Published by 13th International Computer Measurement Group Conference, Orlando, Fla., USA Dec. 7-10, 1987, and also available from Informatik. uni-trier of Germany.

The following describes one environment for the present invention where the data transfer decision program 40 is a data lifecycle management program although the present invention is equally applicable to any environment where data needs to be transferred from one storage device to another storage device for reasons other than data lifecycle management, such as the following: (i) one storage device becomes nearly full, and the data needs to be transferred to another storage device with greater capacity (and the same or different access speed) to accommodate expected growth of the data, (ii) an application which cannot readily access the data in its current storage device needs more direct access to the data, so the data is transferred to another storage device (of the same or different access speed) that is readily accessible by the application, (iii) better balance load across the storage system, and (iv) consolidate storage to reduce operating costs. In case (i), a storage management program for the storage device signals the data transfer scheduling program 45 when utilization of the storage device exceeds a predetermined threshold, such as eighty percent. In case (ii), the application requests a local copy of the data, and the storage placement program 47 forwards the request to the data transfer scheduling program 45. In cases (iii) and (iv), a management program or storage manager passes a set of data migration requests to the data transfer scheduling program 45.

The catalog/database 50 is used by the data transfer decision program/data lifecycle management program 40, and includes data lifecycle management policies, which specify where to place new data (placement policy), when and where to migrate existing data (migration policy), when to delete data (deletion policy) and/or how to spread data across the storage devices (configuration policy). More specifically, a placement policy contains the "type" of storage on which a data unit is initially stored and the criteria (for example, creation date, application affiliation, etc.) specifying which policy should be applied to which data units. A migration policy specifies the "type" of storage to which a data unit should be migrated and the criteria (for example, I/O density, age of the data, current frequency of access to the data, etc.) specifying which policy should be applied to which data units. A deletion policy specifies criteria (for example, age of data, recent frequency of access of the data, etc.) for deleting data. A configuration policy specifies how data units should be spread across the different "types" of storage as well as the data set to which this policy should be applied. For example, the most frequently accessed half of data units in a data set can be placed on a high performance "type" of storage device, and the other half of the data units are stored on a slower, more inexpensive type of storage device. The catalog/database 50 also contains these storage "type" definitions. High-end storage such as flash memory is generally classified as "Tier 0" type storage. High speed disk storage is generally classified as "Tier 1", and lower speed disk storage is generally classified as "Tier 2." Slower, magnetic tape can also be classified as a separate type of storage such as "Tier 3" or "Tier 4".

The "data" in the data units can be computer programs as well as alpha-numerical values for parameters, table entries, relational databases, etc. Each data "unit" is the granularity with which the data is classified, managed and transferred. For example, each data "unit" can be a file, a storage extent, a storage volume or other data block size which an administrator has specified (typically at the direction of the data owner) for the granularity of the data lifecycle management and/or other data transfer. For example, some data owners want to manage storage and transfer of individual data files as a unit, other data owners want to manage storage and transfer of individual storage extents as a unit, and still other data owners want to manage storage and transfer of individual storage volumes (or other physical block sizes) as a unit. Storage "extents" are physical regions or portions of a disk storage device and storage "volumes" are comprised of a set of extents. Storage extents and volumes typically contain more than one data file and typically contain data which is not as closely related to each other as in a single file. In fact, the data files in a storage extent or storage volume, in some cases, may have little substantive relation to each other.

The data transfer decision program 40, in the form of the data life cycle management program, obtains the data life cycle migration policies from the catalog/database 50. The data life cycle management program 40 retrieves storage performance data for each data unit by querying the performance monitoring program 80. The performance monitoring program 80 (such as the previously known IBM Tivoli Storage Productivity Center "TPC" program) tracks the storage performance data by periodically, such as every five minutes, querying the storage subsystems for access data on each data unit that the subsystem collected since the monitoring program's last query. When the data transfer decision program 40 determines that data should be migrated to another storage device based on the data migration policies and current conditions, the data transfer decision program 40 notifies the scheduling program 45 to schedule the data migrations. This notification from the data transfer decision program 40 includes the identity of the data units to be transferred and the identities of the source and destination storage pools. In accordance with the present invention, the scheduling program 45 schedules the data migration based on availability/capacity of the network components and storage resources that will be involved with the data transfer from the source storage pool to the destination storage pool. When the optimum time arrives for the data transfer to commence, the scheduling program 45 sends a data transfer execution command/request to the virtual storage controller computer 90. The data transfer request specifies the identity of the data unit to be transferred, and the identity of the destination storage device.

Virtual storage controller computer 90 executes a virtual storage controller program 99, such as the previously known IBM Storage Volume Controller that defines a data unit as a virtual LUN, and maps a virtual LUN to a set of disk array LUNs in a storage pool to enable applications to address their data by the virtual LUN instead of disk array LUNs or physical addresses. This relieves the applications from the burden of tracking disk array LUNs or physical addresses of data which can be dispersed throughout the storage devices and can change over time. For example, data in a virtual LUN is divided or striped among the multiple disk array LUNs, and data in the virtual LUN may be moved to an entirely different set of disk array LUNs for a variety of reasons such as load balancing or storage consolidation. The virtual storage controller program 99 tracks the set of disk array LUNs to where a virtual LUN's data is stored, and maintains the same virtual LUNs for the convenience of the applications. Mapping of virtual storage identifiers and addresses to actual storage identifiers and physical addresses is well known today, and need not be described further.

During a data transfer, the virtual storage controller program 99 sends read requests to the disks 122*a-n* in the source storage pool to retrieve the data unit's data and writes it out to the disks 132*a-n* in the destination storage pool. The storage subsystem programs 124 and 134 are intermediaries that route the read and write requests of the virtual storage controller program 99 to the read/write heads of the appropriate disks 122*a-n* and 132*a-n*, respectively.

The performance monitoring program 80 tracks various performance parameters for storage devices 120 and 130, virtual storage controller 90 and storage pools, such as (a) I/O request rate, (b) average data transfer size of I/O requests, (c) number and percentage of sequential reads per I/O request, (d) number and percentage of random reads per I/O request, (e) number and percentage of sequential writes per I/O request, (f) number and percentage of random writes per I/O request, (g) average cache hold time, (h) average cache hit ratio, and (i) number and percentage of de-stage operations. The performance monitoring program 80 obtains this tracking data by periodically querying the virtual storage controller program 99 and storage subsystem programs 124 and 134. Programs 99, 124 and 134 keep track of their most recent I/O activity and make it available to programs such as performance monitoring program 80.

The scheduling program 45 determines the time to transfer data units from one storage device to another storage device after a decision has been made (by the data transfer decision program 40) to transfer the data to the other storage device. As explained above, the decision to transfer the data can be based on any of a wide variety of factors such as (i) data life cycle management, (ii) changing requirements of the data owner, (iii) insufficient capacity of the current storage device, (iv) need by another application for local access to the data, (v) load balancing or (vi) storage consolidation. The present invention is directed to the scheduling/timing of the actual data transfer after the decision has been made to transfer the data to another storage device. The scheduling program determines when to perform the requisite transfer based on availability (i.e. currently unused capacity) of the storage components that will be involved in the data transfer.

Figure 2:
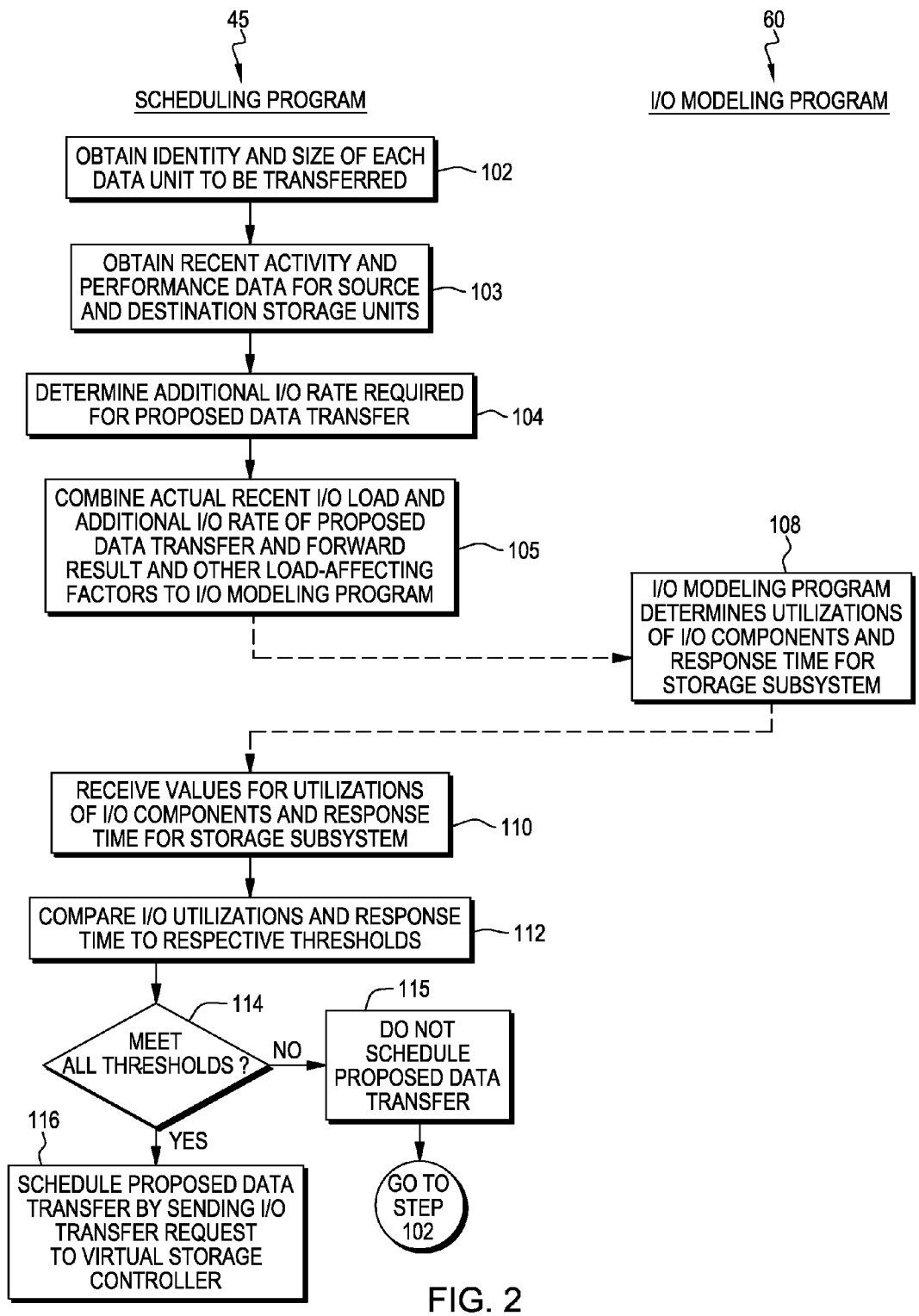
FIG. 2 is a flow chart of a function within a data transfer scheduling program within the computer system of FIG. 1 which determines an optimum time to commence a proposed data transfer.

FIG. 2 is a flow chart of a function of the scheduling program 45 which determines whether and when to initiate a proposed data transfer and the I/O modeling program 60. In step 102, the scheduling program 45 obtains from the data transfer decision program 40 the identity and size of each data unit (for example, a file, virtual disk or other physical block) that the data transfer decision program 40 has recently requested the scheduling program 45 to initiate transfer. The size of each data unit is typically expressed in number of bytes of data in each data unit to be transferred from its current, source storage pool to the destination storage pool.

In the illustrated embodiment, the source storage pool and destination storage pool each consist of a set of storage disks. The set of disks are grouped into virtual pools by the previously known IBM Storage Volume Controller ("SVC") program 99. In step 103, the scheduling program 45 obtains recent data transfer activity and performance data, from the performance monitoring program 80, for the storage components involved in the data transfer that is to be executed. More specifically, the scheduling program 45 obtains from the performance monitoring program 80 recent data transfer activity and performance data for (a) the source storage disks 122*a-n* (or semiconductor elements) in the source storage pool, (b) the source storage subsystem 120 which houses the source storage disks (or semiconductor storage elements), and (c) the virtual storage controller program 99 which virtualizes sets of disks as virtual pools and carries out data transfers. Likewise, the scheduling program 45 obtains from the performance monitoring program 80 recent data transfer activity and performance data for (a) the destination storage disks 132*a-n* (or semiconductor storage elements) in the destination storage pool and (b) the destination storage subsystem 130 which houses the destination storage disks (or semiconductor storage elements). This recent data transfer activity and corresponding performance data indicate the actual, recent utilization of (or load on) the source storage devices and the destination storage devices. The recent data transfer activity and corresponding performance data are assumed to be the current load for purposes of determining the current/baseline utilizations of the storage components involved in the proposed data transfer but not including the extra utilizations of the storage components that would result from the proposed data transfer. The performance data that the scheduling program 45 obtains from the performance monitoring program for the virtual storage controller 99 and the source and destination storage components comprises the following:

Actual number of I/O requests per second.

Actual average data transfer size per I/O request.

The number of I/O requests that the storage system receives and the size of each I/O request has a direct impact on storage subsystem utilizations. This impact applies to all components within the storage subsystem including processor complex, device adapter, host adapter and backend storage disks. For example, storage systems 120 and 130 contain one or more processors that handle all incoming I/O requests and perform other processing tasks such as RAID management, de-duplication, compression etc. If the number of I/O operations per second (IOPS) is high, it will cause the processors to do more work and be more utilized. Similarly depending upon the characteristics of the request (as indicated below), certain I/O operations may require disk arms to be moved more taking more time, and thus limiting the throughput capability of the storage subsystem. The effect is to increase their utilization. Depending upon the subsystem architecture, utilization models capture how varying IOPS and size of each I/O increase the utilization of the components of storage systems 120 and 130.

Actual random read/write percentage of data, i.e. the percentage of reads/writes that are not directed to sequential locations in storage.

Actual sequential read/write percentage of data, i.e. the percentage of reads/writes that are directed to sequential locations in storage.

Workloads characteristics such as random and sequential ratios also impact utilizations of the storage subsystems. Sequential access allows disk arms to move sequentially (which is faster than randomly) and reading of required data continuously. In contrast, random access requires the disk arms to move frequently to reach the right location on the disk, prior to reading the data. This expends time in seeking the data instead of reading the data. Thus, random reads and writes increase utilizations of the subsystems more than sequential reads and writes.

Read/Write ratios in conjunction with the subsystem architecture and configuration settings such as RAID also impact storage component utilizations. For example, RAID 5 has much poorer random write performance than random read. Thus, a highly random write workload on a RAID5 configured storage will increase utilization of the components more than a random read.

Actual average cache-hold time of the data before being paged-out.

Actual read cache-hit percentage of the data.

Actual percentage of de-stage operations, i.e. the percentage of times that the value of data in the cache must be written to the underlying storage device.

Caching of data improves performance of storage subsystems by reading/writing data to RAM instead of disks (which takes longer due to mechanical arm movements). A higher read cache percentage implies that a greater number of read I/O requests are served from RAM instead of disks, causing lesser load (and resulting in lesser utilization) on the subsystem components. Similarly a lower write de-staging percentage indicates that writes stay in RAM longer and are forced to be written to disk less frequently. This also results in lower utilization of the subsystem. The average cache-hold time indicates how well the working set is able to fit inside the cache—if the working set fits well (higher cache-hold time), then most operations are handled by the cache decreasing component utilization. However, if the working set does not fit well, cached items will be paged out often and new items will be obtained from disk, causing higher utilization.

Preferably, the foregoing recent data transfer activity and corresponding performance data are compiled over the last few hours. If actual, recent data transfers do not exist to provide this data, the scheduling program 45 uses default values, previously specified by an administrator, for the foregoing factors.

In step 104, the scheduling program 45 estimates the additional I/O rate that would result from the proposed data transfer, as follows. The scheduling program 45 determines the average size $s_i$ and average duration $d_i$ of the most recent i data transfers from the source storage pool to the destination storage pool that will be involved in the proposed data transfer. Based on this calculation, the scheduling program determines the average transfer rate of the actual recent data transfers as $s_i/d_i=x$ kB/sec. Next, the scheduling program 45 divides the calculated average transfer rate x by the source storage pool's average data transfer size per I/O request to get $y_1$ req/sec. This value is the additional I/O rate that will be added to the current (actual recent) I/O rate of the associated source devices. Similarly, the scheduling program divides the calculated average transfer rate x by the destination storage pool's average data transfer size per I/O request to yield $y_2$ req/sec. This is the additional I/O rate that will be added to the current (actual recent) I/O rate of the associated destination devices. Finally, the scheduling program divides the calculated average transfer rate x by the virtual storage controller's average data transfer size per I/O request to yield $y_3$ req/sec. This is the additional I/O rate that will be added to the current (actual recent) I/O rate of the virtual storage controller. As noted above, for purposes of this analysis, the data for the actual recent data transfers is assumed to reflect current conditions (without the proposed data transfer). When adding the load of the proposed data transfer to the current load of the storage components and virtual storage controller program 99, the scheduling program 45 combines the actual recent and proposed/additional I/O rates and assumes the other performance factors (i.e. actual and sequential read/write percentages, average cache-hold time, average read cache-hit percentage and percentage of de-stage operations) for the proposed/additional data transfer are the same as for the actual recent data transfer (that were calculated).

In step 105, the scheduling program 45 increases the measured I/O rates of the storage devices and virtual storage controller involved in the data transfer to take into account the additional load of the proposed data transfer, as described in the previous paragraph. The scheduling program 45 then passes to the modeling program 60 the increased I/O rates of these devices (which increased due to the load of the proposed data transfer) and their other performance parameters as well (i.e. actual and sequential read/write percentages, average cache-hold time, average read cache-hit percentage and percentage of de-stage operations that were left the same). In the illustrated embodiment, the modeling program 60 is preferably the previously known Disk Magic™ modeling program. (Alternately, the modeling program 60 is the alternate modeling program described above.) In response, in step 108, the Disk Magic modeling program 60 determines the utilizations of the respective storage components involved in the data transfer. Specifically, the Disk Magic modeling program generates utilization values for components within the involved storage subsystems (which contain the source and destination disks that are read from and written to) and the virtual storage controller (which performs the actual data transfer). For a storage subsystem, the Disk Magic modeling program 60 generates utilization values for the subsystem's (a) device adapter (DA), (b) host adapter (HA), (c) SMP processor complex (SMP), and (d) hard disks (HDD). The Disk Magic modeling program calculates the response time of the storage subsystem. For the virtual storage controller program 99, the Disk Magic modeling program 60 generates utilization values for the foregoing components (a), (b) and (c) but not (d). The subsystem and virtual storage controller are limited by the most utilized of the foregoing components. The Disk Magic modeling program determines the projected utilization of these components (for the actual recent measured load combined with the proposed data transfer load) using the previously known Disk Magic modeling program algorithm. The algorithm used by the Disk Magic modeling program to determine the utilizations of the storage components based on the foregoing factors is proprietary to IntelliMagic Inc. and unknown to the present inventors. However, the other modeling algorithm previously described can be used to determine utilizations of storage components based on similar factors.

The Disk Magic modeling program 60 (or other modeling program) then returns to the scheduling program 45 the values for the utilizations of the respective subsystem and virtual storage controller components and the value for the overall response time of the storage subsystem (step 110).

Next, the scheduling program 45 compares the projected utilization (as determined by the modeling program 60) of each of the storage components to predetermined, respective thresholds to determine if all of the storage components would be able to handle the additional load of the proposed data transfer without exceeding predetermined upper limits of utilization (Step 112). For example, it is good practice to avoid exceeding 80% of full utilization of certain storage components because that would likely result in slow performance and would not leave sufficient margin of growth. In Step 112, the scheduling program 45 can optionally compare the response time of the involved subsystems to respective predetermined lower thresholds to determine if the response times will be acceptable to the applications accessing the storage subsystems. If all comparisons meet the applicable thresholds indicating no overload of any of the storage components and satisfactory response time due to the proposed data transfer (Decision 114, yes branch), then the scheduling program 45 schedules the data transfer command/request by sending the data transfer command/request to the virtual storage controller program 99, which executes data transfer commands/requests as received from the scheduling program 45 (Step 116). (If the virtual storage controller program 99 cannot keep up with the data transfer commands/requests received from the scheduling program, the virtual storage controller program 99 returns an error command for each data transfer command/request that it cannot handle at the time of receipt. In response, the scheduling program 45 will retry the data transfer command/request later.)

Refer again to Decision 114, no branch where one or more of the storage component utilizations or response times fails to meet the applicable thresholds such that one or more respective storage devices would be overloaded by the proposed data transfer, and the scheduling program 45 does not schedule the proposed data transfer (Step 115). In such a case, as explained in more detail below; the scheduling program 45 iteratively performs steps 102-116 at later times to re-evaluate whether the proposed data transfer will overload the storage components or result in unacceptable subsystem response times based on changing actual recent conditions. When there is sufficient availability of the storage components and low subsystem response times, the scheduling program 45 schedules the proposed data transfer by sending the data transfer command/request to the virtual storage controller program 99.

The scheduling program 45 maintains the input scheduling queue 46 (also known as an I/O request queue) of data transfer commands/requests that await scheduling and transfer to the virtual storage controller program 99. (In the illustrated embodiment of the present invention, each data transfer command/request pertains to data having a granularity of one data unit.) The scheduling program 45 evaluates the data transfer command/request at the head of the queue 46 based on steps 102-116. If the decision 114 is to schedule the data transfer command/request (decision 114, yes branch), the scheduling program removes it from the queue 46 and forwards it to the virtual storage controller program 99 (step 116). If not (decision 114, no branch), the scheduling program 45 leaves the data transfer command/request on the queue 46 (step 115). The scheduling program 45 then evaluates the next data transfer command/request on the queue 46. This continues until all data commands/requests in the queue 46 are evaluated. Alternatively, the scheduling program 45 can use a priority queue where data transfer requests for data units requiring lower storage system utilization are positioned nearer the front of the queue than data transfer requests for data units requiring higher storage system utilization. In this manner, the data transfers near the front of the queue are more likely to succeed and less likely to be suspended after evaluation.

The scheduling program 45 performs steps 102-116 for each data unit/transfer command/request on the queue 46 and evaluates each data unit/transfer command once. The data transfer commands/requests that can be executed without overloading the virtual storage controller(s), storage subsystems or storage pools are removed from the queue 46 and transferred to the virtual storage controller program 99, and the data transfer commands/requests that cannot be executed remain on the queue 46. The scheduling program 45 then sleeps for a pre-determined interval, wakes up, and repeats steps 102-116 for each of the remaining data transfer command/request on the queue 46 that was not transferred due to an overload at the time of their prior consideration.

Figure 3:
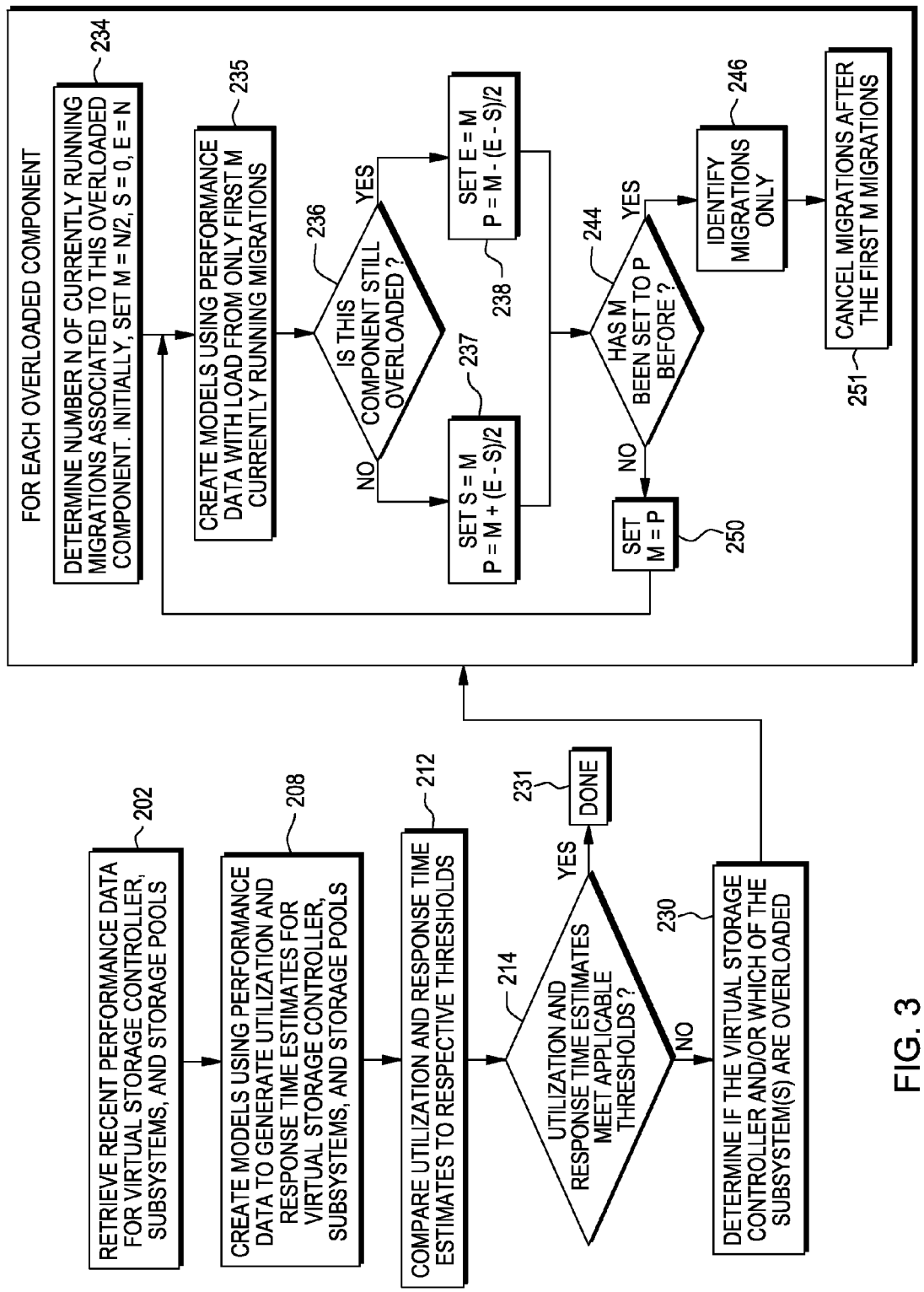
FIG. 3 is a flow chart of another function within the data transfer scheduling program which determines if I/O components involved in a data transfer are currently overloaded, and if so, selectively terminates certain of the current data transfers.

FIG. 3 is a flow chart illustrating another function performed by the scheduling program 45 to periodically determine the utilizations of the storage components involved in current data transfers to determine if any of the components are currently overloaded or the storage subsystem response times are too slow under current/actual data transfers (irrespective of any proposed data transfer yet to be scheduled). If so, the scheduling program 45 cancels some of the currently executing data transfers through the virtual storage controller program 90. The currently executing data transfers are those data transfer commands/requests that the virtual storage controller 99 has begun to transfer as "tentative" updates recorded at the target storage pool, but has not yet completed the transfer of the entire data unit. The "tentative" updates do not replace the prior data until the entire data unit has been transferred, and address pointers are moved from the prior data to the "tentative" updates. The virtual storage controller typically transfers data in parallel/concurrently from more than one storage location of the source to more than one storage location of the target. Consequently, typically, there are multiple data transfer requests in-progress concurrently at any time.

In step 202, the scheduling program 45 obtains from the performance monitoring program 80 performance data (i.e. I/O rates, average transfer sizes, actual and sequential read/write percentages, average cache-hold times, average read cache-hit percentages and percentage of de-stage operations)

of storage components involved in currently running data transfers. The scheduling program passes this data in turn to the modeling program 60.

In step 208, the modeling program 60 determines the actual recent utilizations of the respective storage components involved in the currently running data transfers and storage subsystem response times, as in step 108. The modeling program 60 returns the results to the scheduling program 45.

In response, in step 212, the scheduling program 45 compares the actual recent utilizations of the storage components and storage subsystem response times to predetermined, respective thresholds to determine if all of the storage components are currently able to handle the running data transfers and have not exceeded the predetermined upper limits of utilization. Step 212 is performed as in step 112, except in step 212 only the performance data for the actual recent data transfers is considered. If all the comparisons meet the applicable thresholds indicating satisfactory performance/no overload of any of the storage components (decision 214, yes branch), then the scheduling program 45 permits (by not notifying the virtual storage controller program 99 otherwise) the in-progress data transfers to continue. However, if one or more of the utilization calculations or overall response times fail to meet the applicable thresholds, this indicates that one or more respective storage components (i.e. the virtual storage controller program 99 and storage subsystems 120, 130) are currently overloaded by the in-progress data transfers (decision 214, no branch). In response, the scheduling program 45 cancels some of the in-progress data transfers, as follows.

In step 230, the scheduling program 45 determines which storage component(s) (i.e. the virtual storage controller program 99 and storage subsystems 120, 130) is overloaded by comparing the utilization calculations (generated by the modeling program 60 using performance data from the performance monitoring program 80) for each storage component to the applicable threshold.

The scheduling program then analyzes each overloaded storage component (i.e. the virtual storage controller program 99 and storage subsystems 120, 130) in turn, with the overloaded virtual storage controller program processed first (and the storage subsystems 120 and 130 processed in any order) according to steps 234-251. For each overloaded storage component, the scheduling program 45 first determines the number N of data transfers currently executing that involve the storage component (step 234). The scheduling program 45 determines the currently executing data transfers that involve the overloaded storage component by reading the source and target addresses in the data transfer requests to determine if they match the overloaded storage subsystems and associated virtual storage controller program. For the first round of modeling, the scheduling program 45 sets a variable M (i.e. the number of data transfers to consider this round) to N/2, sets S (i.e. a start index in a list of currently executing data transfers) to 0, and sets E (i.e. an end index in the list of currently executing data transfers) to N. (If N is an odd number, then M/2 is rounded up to the next higher integer.) Without actually canceling any currently executing data transfers, the scheduling program 45 requests the modeling program 60 to model this storage component with M of the associated in-progress data transfers hypothetically canceled (i.e. no in-progress data transfers are actually canceled yet but their I/O load is removed from the component's I/O rate for purposes of modeling) (step 235). If the storage component's utilization values are found to drop below the thresholds (decision 236, no branch), then the scheduling program sets S to M (to keep at least the current value of M currently-executing data transfer commands/requests and potentially keep more of the currently-executing data transfer commands/requests as determined during subsequent iterations of steps 234-250) and sets a temporary variable P to equal M+(E−S)/2 for the next iteration (step 237). However, if the utilization values are still too high (decision 236, yes branch), the scheduling program sets E to M (to keep no more than the current value of M currently-executing data transfer commands/requests and potentially keep fewer of the currently-executing data transfer commands/requests as determined during subsequent iterations of steps 234-250) and sets P to equal M−(E−S)/2 (step 238) for the next iteration. After steps 237 and 238, the scheduling program checks if the scenario where P migrations are hypothetically canceled has been analyzed before (decision 244). If not (decision 244, no branch), the scheduling program continues with the same overloaded storage component and loops back to step 235 to perform the next modeling round/iteration by setting M to P (step 250). Thus, M is increased (by the prior value of M divided by two) during this next iteration if the prior value of M avoided the overload of the storage component, and M is decreased (by the prior value of M divided by two) during this next iteration if the prior value of M maintained the overload of the storage component. If the scenario has in fact been checked before (decision 244, yes branch), the scheduling program 45 determines that a number "M" of currently executing, data transfer commands/requests should be maintained/continued and the excess canceled (and moved back to the input scheduling queue 46 to be scheduled and executed later when more bandwidth exists). Thus, the scheduling program 45 adjusts the value of M (up or down) by decreasing increments during each modeling round, i.e. during each iteration of steps 234-250, to successively approximate the optimum number of currently executing, data transfer command/requests to maintain (and cancel the excess). In general, this algorithm determines, in a minimum number of iterations, the optimum number, i.e. an approximately minimum number, of currently executing data transfer commands/requests to cancel to provide satisfactory performance of the overloaded storage component. Next, the scheduling program determines which of the currently executing data transfer commands/requests in excess of M to cancel as those data transfer commands/requests that were last to begin execution. For example, if there are a total of "T" currently executing data transfer commands/requests that involve the overloaded storage component, then the scheduling program will cancel the last "T−M" of them to begin execution. The scheduling program determines the time that each data transfer commands/request began to execute based on a log record made by the scheduling program when it sent the data transfer commands/request to the virtual storage controller for execution. Next, the scheduling program actually cancels the currently executing data transfer commands/requests in excess of the M that involve the overloaded storage component and were last to begin execution by identifying them to the virtual storage controller and notifying the virtual storage controller to cancel them (step 251). In response, the virtual storage controller terminates transfer of the data units associated with these currently executing data transfer commands/requests in excess of the first "M" data transfer commands/requests (that involve the overloaded storage component and were last to begin execution) such that remainders of these data units which have not yet been transferred to the target storage devices are not transferred to the target storage devices, and the portions of these data units which have already been transferred to the target storage devices do not replace the corresponding, valid portions of the data units (step 251). In the foregoing embodiment of the present invention, all the data transfer commands/requests that involve the overloaded storage component were data migration commands/requests.

In an alternative embodiment of the present invention, in decision 236, the scheduling program 45 determines if the hypothetical amount of overload (with the current value of "M") is less than a predetermined level (such as less than 5% overloaded) or if the hypothetical amount of utilization under the threshold for overload (with the current value of "M") is less than a predetermined level (such as less than 10% less than the threshold for overload). In either case, the scheduling program determines that the current value of "M" is close enough to the minimum number of data transfer requests/commands to cancel the excess beyond M of the currently executing data transfer commands/requests involving the overloaded storage component, for satisfactory performance of the overloaded storage component, and jumps to step 251 to cancel the excess of the currently executing data transfer commands/requests beyond the current value M of (in-progress) data transfer commands/requests involving the overloaded storage component.

In one embodiment of the present invention, the data transfer commands/requests currently being executed (in parallel) for the overloaded storage component are all data migration requests, i.e. requests to migrate data from one type of storage device to another type of storage device, for various reasons described above. Next, the scheduling program 45 cancels the currently executing data transfer commands/requests in excess of the first M migration requests for the overloaded storage component (step 251), where the currently executing data transfer commands/requests in excess of the first M migrations to be canceled are the most recent to start execution (leaving the older migrations which have progressed further, to continue executing). The scheduling program 45 cancels the (most recent to begin execution of) currently executing data transfer commands/requests in excess of M migration requests by identifying the (most recent to begin execution of) currently executing data transfer commands/requests in excess of M migration requests sent to the virtual storage controller 99 and notifying the virtual storage controller 99 to stop executing them. In response, the virtual storage controller 99 stops executing the (most recent to begin execution of) currently executing data transfer commands/requests in excess of M migration requests. For any of the currently executing data transfer commands/requests in excess of M migration requests whose respective data units are partially transferred, the virtual storage controller 99 cancels the "tentative" updates made so far, as follows. The virtual storage controller 99 makes a copy of the requested updates of a data unit to the target subsystem as they are transferred to the target, and only after all the requested updates are made for a data unit, does the virtual storage controller replace the original data with the copy (by moving pointers for valid data). So, if the scheduling program 45 cancels a partially executed data transfer request, the virtual storage controller ignores the "tentative" updates, so no actual updates are made to the actual/valid data in the target storage pool. Next, the scheduling program 45 adds the canceled migration requests back on to the input scheduling queue 46 to be scheduled at a later time (according to the flow chart of FIG. 2). Next, the scheduling program 45 repeats step 234-251 for the next overloaded storage component in the list.

According to an optional feature of the present invention, there are different types of data transfer commands/requests including data migration requests and other types of higher-priority data transfer requests, such as e-mail requests and web server/application requests, and they can all involve the overloaded virtual storage controller or storage subsystem and be currently executed. In step 246, the scheduling program 45 requests the virtual storage controller program 99 to identify the migration requests from the set of all data transfer requests that involve the overloaded virtual storage controller or storage subsystem and are currently being executed. The virtual storage controller program identifies these migration requests from identification numbers in the packets/frames of the data units. The virtual storage controller program previously assigned, recorded and classified the identification numbers for each request it received (from any requestor). The virtual storage controller classifies the identification numbers as "migration" requests where the format of the request corresponds to the known format of a migration request. These are the requests received from the scheduling program which only sends migration requests (in the illustrated embodiment). Thus, from the record, the virtual storage controller can identify data migration requests and distinguish them from other types of requests. A web server/application sends its data transfer requests directly to the virtual storage controller, bypassing the data transfer management computer, and the format of data transfer requests from the application is different than the format of data transfer requests from the scheduling program. The virtual storage controller classifies the data transfer requests having the known format of data transfer requests received from an application as "application" requests. Likewise, the virtual storage controller classifies other types of data transfer requests, such as requests from an e-mail server, based on the known formats of these other types of data transfer requests. Next, the scheduling program 45 cancels the currently executing migration commands/requests in excess of first M data transfer commands/requests of any type (step 251), where the currently executing migration commands/requests in excess of M data transfer commands/requests of any type are the most recent to begin execution (leaving the older migrations which have progressed further, to continue running). The scheduling program 45 does not cancel the other, higher-priority (e-mail and web server) requests so all the other, higher-priority types of data transfer requests continue to execute. The scheduling program 45 cancels the (most recent to begin execution) currently executing migration commands/requests in excess of M data transfer commands/requests of any type by identifying the (most recent to begin execution) currently executing migration commands/requests in excess of M data transfer commands/requests of any type to the virtual storage controller 99 and notifying the virtual storage controller 99 to stop executing the (most recent to begin execution) currently executing migration commands/requests in excess of M data transfer commands/requests of any type. In response, the virtual storage controller 99 stops executing the (most recent to begin) currently executing migration commands/requests in excess of M data transfer commands/requests of any type. For any of the currently executing migration commands/requests in excess of M data transfer commands/requests of any type whose respective data units are partially transferred as "tentative" updates, the virtual storage controller 99 ignores the tentative updates. Next, the scheduling program adds the canceled migration commands/requests back on to the scheduling queue 46 to be scheduled at a later time (according to the flow chart of FIG. 2). Next, the scheduling program 45 repeats step 234-251 for the next overloaded storage component in the list.

Figure 4:
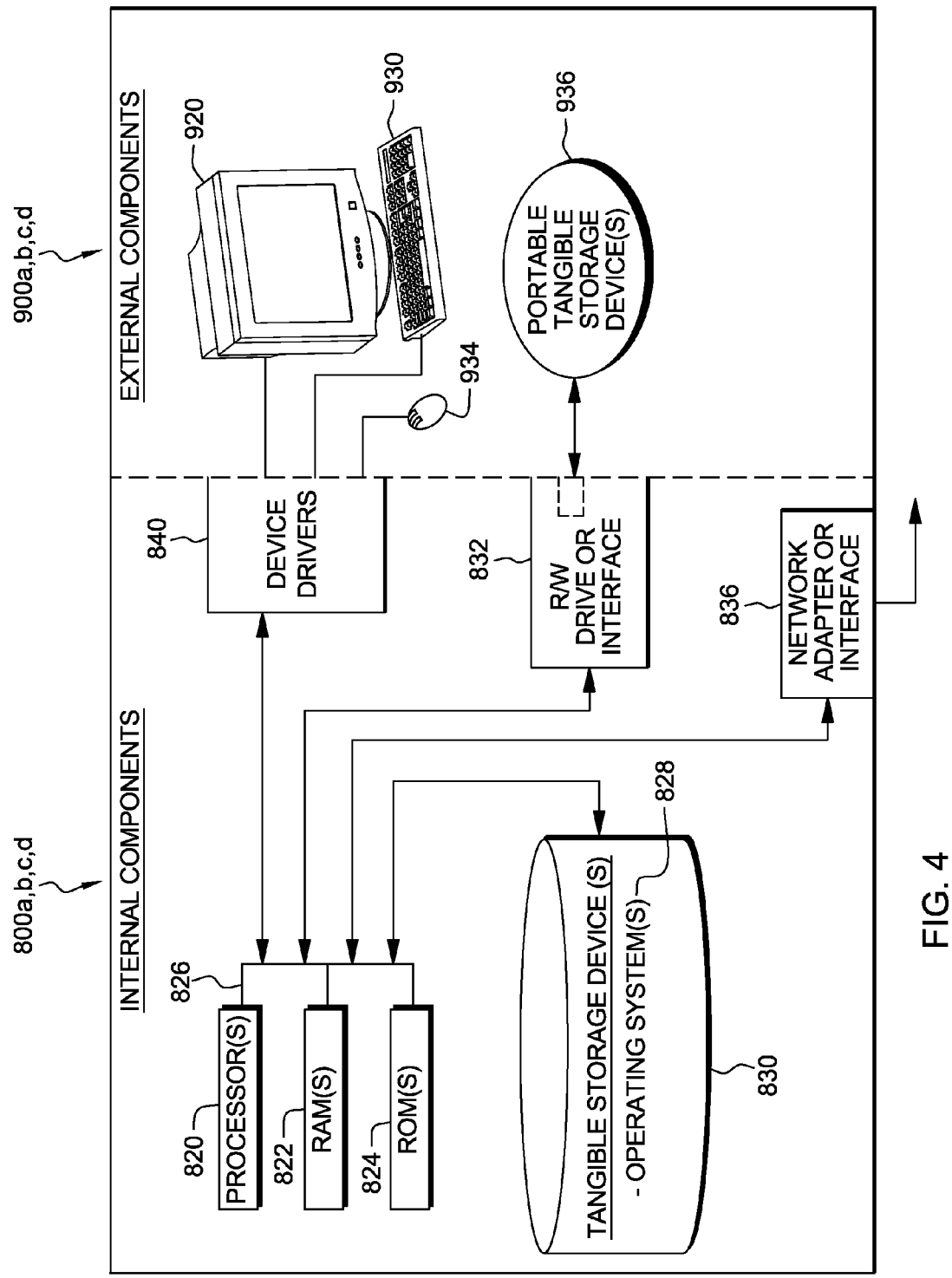
FIG. 4 is a block diagram of internal and external components of each of the computers of FIG. 1.

Computers 30, 90, 120 and 130 include respective sets of internal components 800*a,b,c,d* and external components 900*a,b,c,d* illustrated in FIG. 4. Each of the sets of internal components 800*a,b,c,d* includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs 40, 45, 47, 60 and 80 (in computer 30), program 99 (in computer 90), program 124 (in computer 120) and program 134 (in computer 130) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store but does not propagate a computer program and digital information.

Each set of internal components 800a,b,c also includes a R/W drive or interface 832 to read from and write to one or more portable computer-readable tangible storage devices 936 that can store but do not propagate a computer program such as a CD-ROM, DVD, memory stick, magnetic tape, magnetic disk, optical disk or semiconductor storage device. The programs 40, 45, 47, 60 and 80 (in computer 30), program 99 (in computer 90), program 124 (in computer 120) and program 134 (in computer 130) can be stored on one or more of the respective portable computer-readable tangible storage devices 936, read via the respective R/W drive or interface 832 and loaded into the respective hard drive 830.

Each set of internal components 800a,b,c also includes a network adapter or interface 836 such as a TCP/IP adapter card. The programs 40, 45, 47, 60 and 80, program 99, program 124 and program 134 can be downloaded to respective computers 30, 90, 120 and 130 from an external computer via a network (for example, the Internet, a local area network or other, wide area network) and respective network adapter or interface 836. From the network adapter or interface 836, the programs 40, 45, 47, 60 and 80, program 99, program 124 and program 135 are loaded into the respective hard drive 830. The network may comprise copper wires, optical fibers, wireless transmission, routers, firewalls, switches, gateway computers and/or edge servers.

Each of the sets of external components 900a,b,c includes a computer display monitor 920, a keyboard 930, and a computer mouse 940. Each of the sets of internal components 800a,b,c also includes device drivers 840 to interface to computer display monitor 920, keyboard 930 and computer mouse 940. The device drivers 840, R/W drive or interface 832 and network adapter or interface 836 comprise hardware and software (stored in storage device 830 and/or ROM 824).

Programs 40, 45, 47, 60 and 80, program 99, program 124 and program 134 can be written in various programming languages (such as Java, C+, etc.) including low-level, high-level, object-oriented or non object-oriented languages. Alternatively, the functions of programs 40, 45, 47, 60 and 80, program 99, program 124 and program 134 can be implemented in whole or in part by computer circuits and other hardware (not shown).

Based on the foregoing, computer system, method and program product have been disclosed for scheduling data transfers. However, numerous modifications and substitutions can be made without deviating from the scope of the present invention. Therefore, the present invention has been disclosed by way of example and not limitation.

The invention claimed is:

1. A method for managing a data transfer from one or more source storage devices to one or more target storage devices, the data transfer comprising concurrent transfer of a multiplicity of data units pursuant to respective data transfer commands, the concurrent transfer of the multiplicity of data units being currently in-progress, the method comprising the steps of:

a computer determining a currently-overloaded storage component involved in the data transfer;

the computer determining a plurality of the data transfer commands that involve the storage component; and the computer determining a target number but not all of the data transfer commands that involve the storage component to cancel to avoid the overload of the storage component, the computer determining the target number by modeling an effect on the load of the storage component of hypothetically cancelling one or more different numbers of the data transfer commands that involve the storage component; and the computer canceling the target number of the data transfer commands that involve the storage component.

2. The method of claim 1 wherein the storage component is a virtual storage controller which maps virtual storage addresses to real storage addresses in the one or more source storage devices or the one or more target storage devices.

3. The method of claim 1 wherein the storage component is a storage subsystem which includes one or more of the source storage devices or one or more of the target storage devices.

4. The method of claim 1 wherein the computer determines the target number of the data transfer commands that involve the storage component to cancel by hypothetically canceling approximately half of the data transfer commands that involve the storage component, determining if the storage component would still be overloaded if the approximately half of the data transfer commands that involve the storage component were hypothetically canceled, and if not, hypothetically canceling approximately one fourth of the data transfer commands that involve the storage component instead of hypothetically canceling approximately half of the data transfer commands that involve the storage component and determining if the storage component would still be overloaded if the approximately one fourth of the data transfer commands that involve the storage component were hypothetically canceled.

5. The computer of claim 1, the computer comprising one or more processors, one or more computer-readable memories, one or more computer-readable tangible storage devices and program instructions which are stored on the one or more storage devices for execution by the one or more processors via the one or more memories and when executed by the one or more processors perform the method of claim 1.

6. The method of claim 1 wherein the computer determines the overload of the storage component by comparing the load on the storage component to a predetermined threshold.

7. The method of claim 6 wherein the target number is the approximately minimum number of the data transfer commands that involve the storage component that, after cancellation, reduce the load on the storage component to below the predetermined threshold.

8. A computer program product comprising one or more computer-readable tangible storage devices and computer-readable program instructions which are stored on the one or more storage devices and when executed by one or more processors of the computer of claim 1 perform the method of claim 1.

9. A computer program product for managing a data transfer from one or more source storage devices to one or more target storage devices, the data transfer comprising concurrent transfer of a multiplicity of data units pursuant to respective data transfer commands, the concurrent transfer of the multiplicity of data units being currently in-progress, the computer program product comprising:
one or more computer-readable tangible storage devices and program instructions stored on at least one of the one or more storage devices, the program instructions comprising:
first program instructions to determine a currently-overloaded storage component involved in the data transfer;
second program instructions to determine a plurality of the data transfer commands that involve the storage component;
third program instructions to determine a target number but not all of the data transfer commands that involve the storage component to cancel to avoid the overload of the storage component, the third program instructions determine the target number by modeling an effect on the load of the storage component of hypothetically cancelling one or more different numbers of the data transfer commands that involve the storage component, and cancel the target number of the data transfer commands that involve the storage component.

10. The computer program product of claim 9 wherein the storage component is a virtual storage controller which maps virtual storage addresses to real storage addresses in the one or more source storage devices or the one or more target storage devices.

11. The computer program product of claim 9 wherein the storage component is a storage subsystem which includes one or more of the source storage devices or one or more of the target storage devices.

12. The computer program product of claim 9 wherein the program instructions to determine the target number of the data transfer commands to cancel determines the target number of the data transfer commands to cancel by hypothetically canceling approximately half of the data transfer commands that involve the storage component, determining if the storage component would still be overloaded if the approximately half of the data transfer commands that involve the storage component were hypothetically canceled, and if not, hypothetically canceling approximately one fourth of the data transfer commands that involve the storage component instead of hypothetically canceling approximately half of the data transfer commands that involve the storage component and determining if the storage component would still be overloaded if the approximately one fourth of the data transfer commands that involve the storage component were hypothetically canceled.

13. The computer program product of claim 9 wherein the first program instructions determine the overload of the storage component by comparing the load on the storage component to a predetermined threshold.

14. The computer program product of claim 13 wherein the target number is the approximately minimum number of the data transfer commands that involve the storage component that, after cancellation, reduce the load on the storage component to below the predetermined threshold.

15. A computer system for managing a data transfer from one or more source storage devices to one or more target storage devices, the data transfer comprising concurrent transfer of a multiplicity of data units pursuant to respective data transfer commands, the concurrent transfer of the multiplicity of data units being currently in-progress, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
first program instructions to determine a currently-overloaded storage component involved in the data transfer;
second program instructions to determine a plurality of the data transfer commands that involve the storage component;
third program instructions to determine a target number but not all of the data transfer commands that involve the storage component to cancel to avoid the overload of the storage component, the third program instructions determine the target number by modeling an effect on the load of the storage component of hypothetically cancelling one or more different numbers of the data transfer commands that involve the storage component, and cancel the target number of the data transfer commands that involve the storage component.

16. The computer system of claim 15 wherein the storage component is a virtual storage controller which maps virtual storage addresses to real storage addresses in the one or more source storage devices or the one or more target storage devices.

17. The computer system of claim 15 wherein the storage component is a storage subsystem which includes one or more of the source storage devices or one or more of the target storage devices.

18. The computer system of claim 15 wherein the program instructions to determine the target number of the data transfer commands to cancel determines the target number of the data transfer commands to cancel by hypothetically canceling approximately half of the data transfer commands that involve the storage component, determining if the storage component would still be overloaded if the approximately half of the data transfer commands that involve the storage component were hypothetically canceled, and if not, hypothetically canceling approximately one fourth of the data transfer commands that involve the storage component instead of hypothetically canceling approximately half of the data transfer commands that involve the storage component and determining if the storage component would still be overloaded if the approximately one fourth of the data transfer commands that involve the storage component were hypothetically canceled.

19. The computer system of claim 15 wherein the first program instructions determine the overload of the storage component by comparing the load on the storage component to a predetermined threshold.

20. The computer system of claim 19 wherein the target number is the approximately minimum number of the data transfer commands that involve the storage component that, after cancellation, reduce the load on the storage component to below the predetermined threshold.

* * * * *